United States Patent [19]

Hummel, Jr. et al.

[11] Patent Number: 5,195,794
[45] Date of Patent: Mar. 23, 1993

[54] COMPACT DISK LIFTING DEVICE

[75] Inventors: Donald L. Hummel, Jr., LaPorte, Ind.; Michael Bacon, Greenville, Pa.

[73] Assignee: KIS Products, Greenville, Pa.

[21] Appl. No.: 598,972

[22] Filed: Oct. 16, 1990

[51] Int. Cl.⁵ .............................................. B66C 1/00
[52] U.S. Cl. ............................ 294/94; 369/292
[58] Field of Search ............... 369/270, 271, 290, 291, 369/292; 360/99.04, 99.05, 99.12; 29/568, 26 A; 409/144, 233; 294/93, 94, 95, 96, 27.1

[56] References Cited

U.S. PATENT DOCUMENTS

| | | | |
|---|---|---|---|
| 976,325 | 11/1910 | Wheeler et al. | 294/94 |
| 1,958,330 | 5/1934 | Beard | 294/95 |
| 2,320,967 | 6/1943 | Dunkelberger | 294/100 |
| 2,546,950 | 3/1951 | Nixon | 294/93 |
| 2,970,445 | 2/1961 | Suderow | 294/96 |
| 3,228,555 | 1/1966 | Pinto | 221/199 |
| 3,574,381 | 4/1971 | Ocheltree et al. | 294/94 |
| 3,709,546 | 1/1973 | Vaughan | 294/96 |
| 3,905,190 | 9/1975 | Pearlman | 294/94 |
| 4,283,082 | 8/1981 | Tracy | 294/15 |
| 4,377,956 | 3/1983 | Cooper | 294/95 |
| 4,653,038 | 3/1987 | Boudreaux | 369/292 |
| 4,777,792 | 10/1988 | Marzoli | 57/275 |
| 4,926,410 | 5/1990 | Suzuki et al. | 369/271 X |
| 4,927,205 | 5/1990 | Bowler et al. | 294/94 |

FOREIGN PATENT DOCUMENTS 1-3866  1/1989  Japan .................................. 369/270

Primary Examiner—Eugene R. La Roche
Assistant Examiner—Michael C. Kessell
Attorney, Agent, or Firm—Thomas J. Dodd

[57] ABSTRACT

A lifting device for lifting and releasing a compact disk. The lifting device including a pair of fins extended by a plunger and retracted by an O-ring contacting the fins at their outer edge.

8 Claims, 3 Drawing Sheets

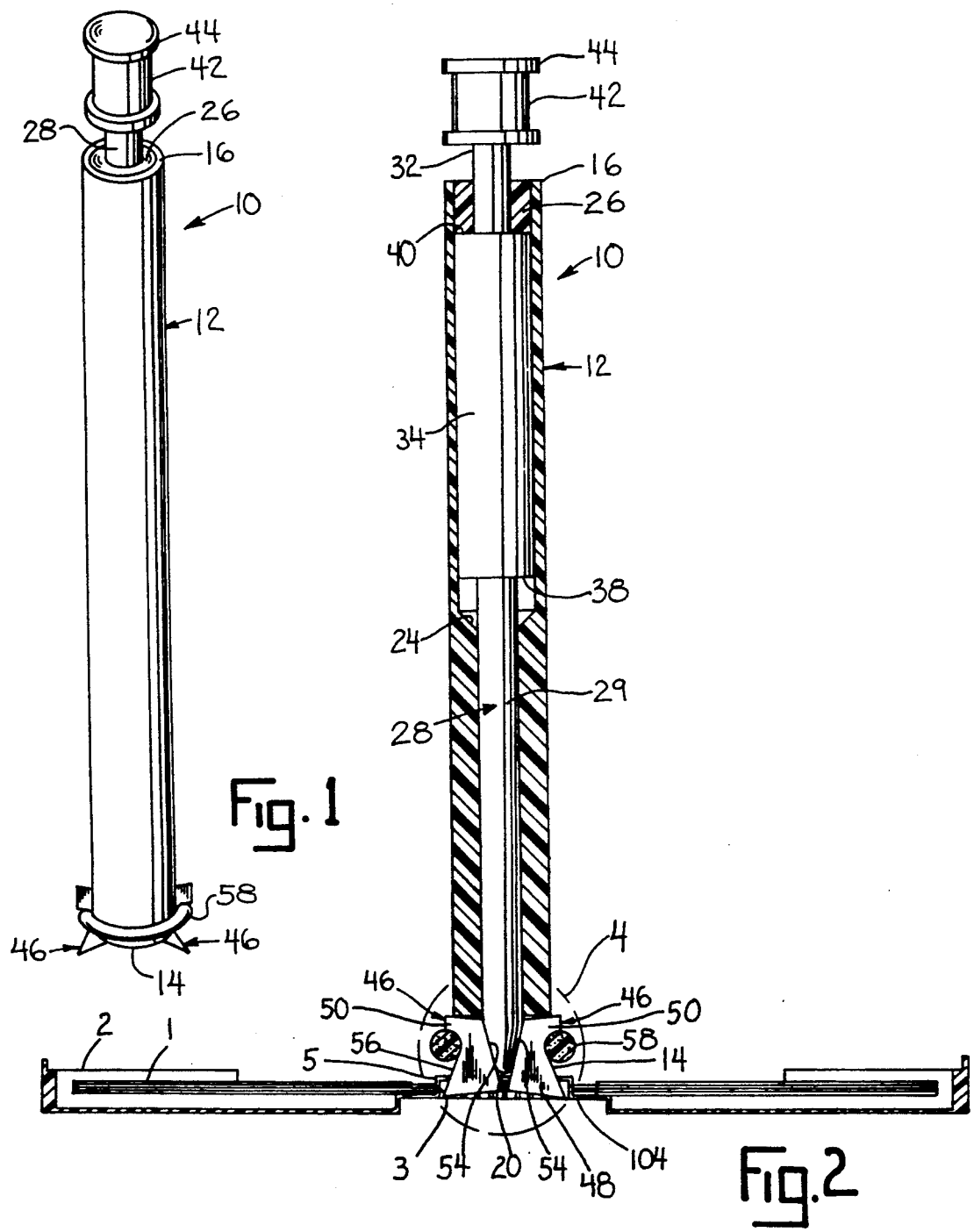

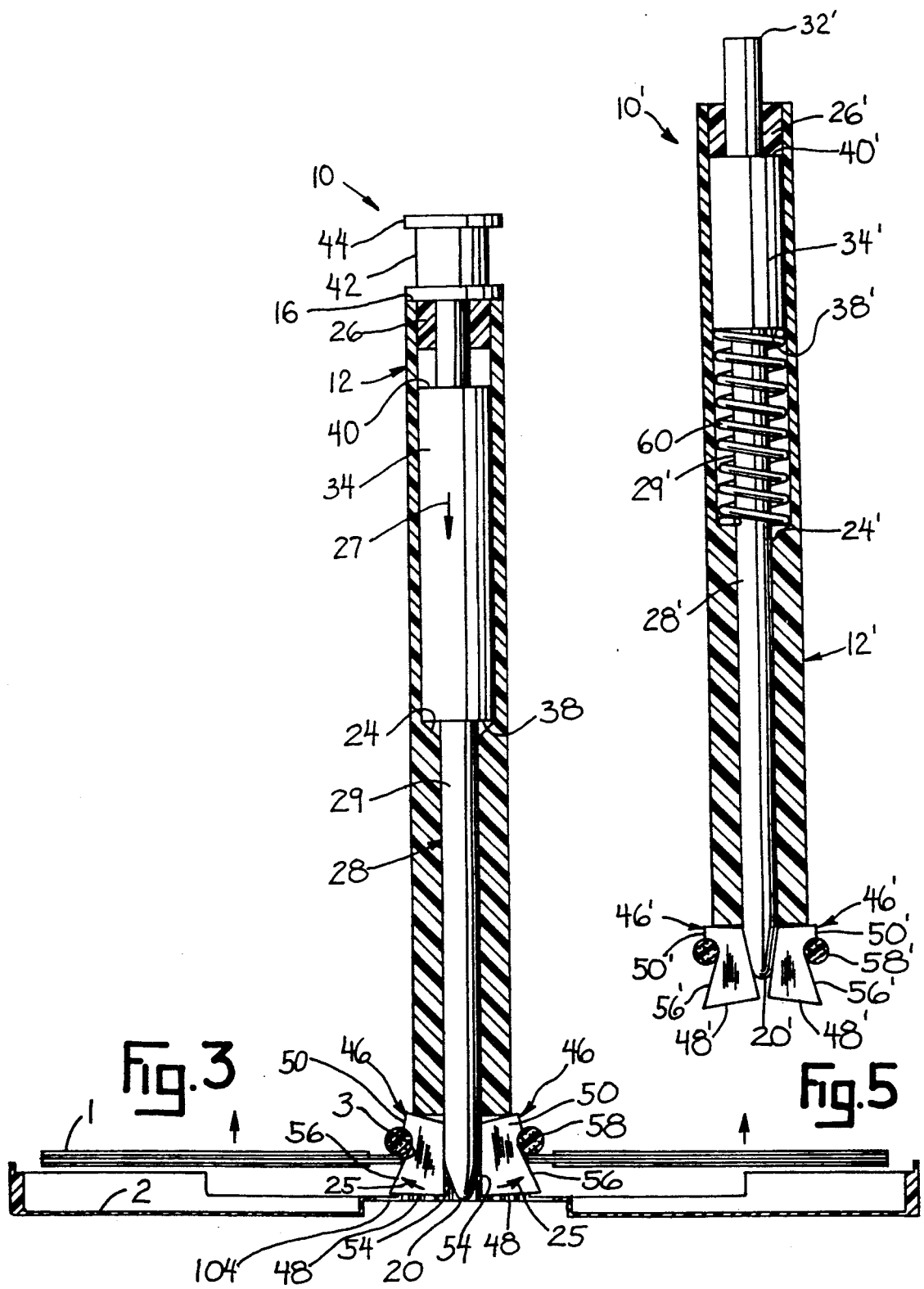

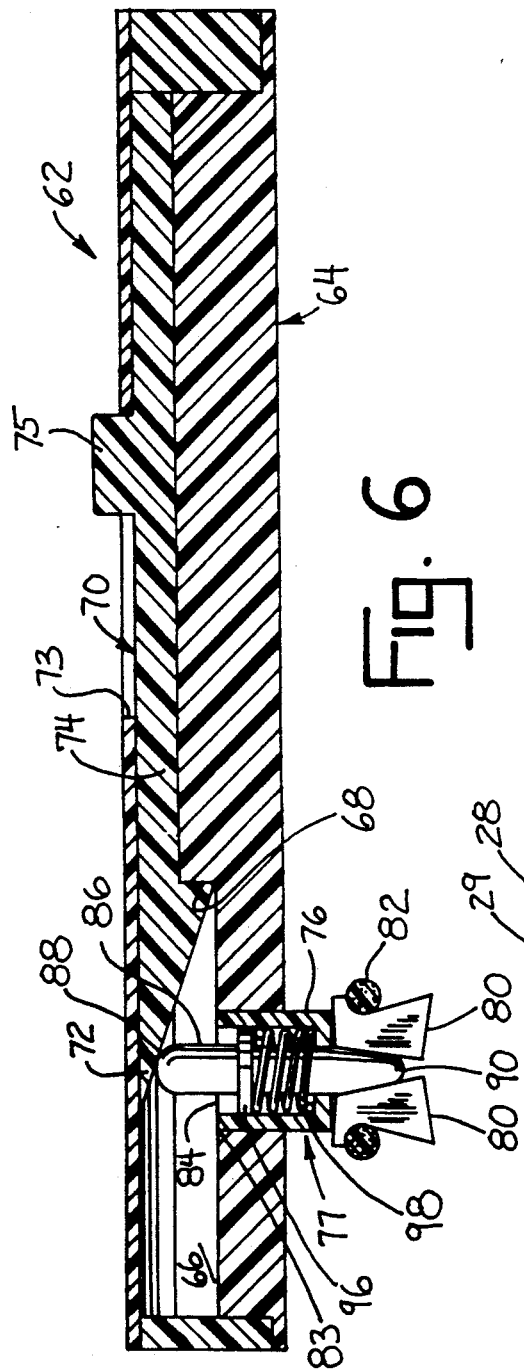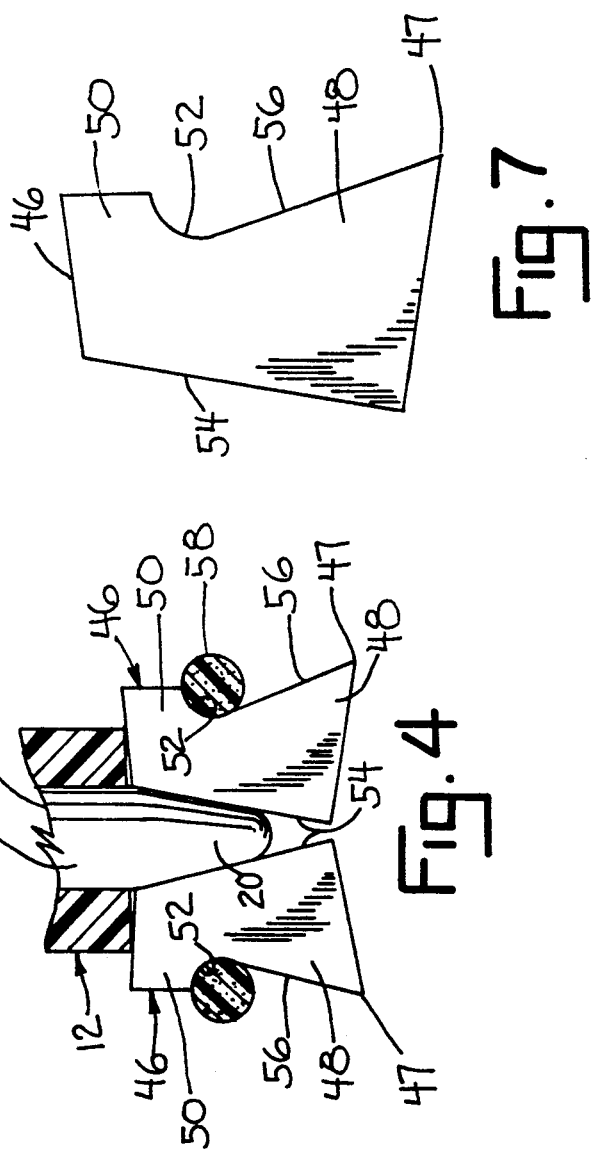

COMPACT DISK LIFTING DEVICE

FIELD OF THE INVENTION

This invention relates generally to a device for picking up and retaining a ring-like object and has specific relevance to a device for picking up a compact disk.

BACKGROUND OF THE INVENTION

Digital audio compact disks, more commonly referred to as compact disks or CDs, have gained wide acceptance in recent years. CDs in general have a translucent coating for protecting a digitally encoded optically read medium from damage. A problem experienced with CDs is a result of improper handling by the user. While the translucent coating protects the encoded medium from damage quite well, the coating has a tendency to pickup finger prints and smudges from the user's hands. Those smudges negatively affect the clarity of the translucent coating which in turn deteriorates the sound quality of the CD player unable to cleanly read the encoded music through the smudge.

In addition, if the CD is forced from its storage unit, the flexing of the CD over time may cause cracking of the translucent coating, exposing the encoded medium to the atmosphere, leading to oxidation and a deliniation of sound quality.

SUMMARY OF THE INVENTION

The compact disk lifting device of this invention eliminates the problem described above by providing a lifting device for a CD. The lifting device includes a longitudinal housing carrying a shiftable rod which cams a pair of fins outwardly to engage the edge of a CD's inner opening. Once engaged by the fins, the CD may be lifted from its carrier and placed on a CD player. A rubber O-ring engages the fins to bias the fins toward each other for insertion into the CD opening and to act as a soft bumper for the CD. To release the CD the rod is shifted away from the fins which allows the fins to retract under force of the O-ring to permit the CD to slide off the fins.

Accordingly, it is an object of this invention to provide a novel lifting device for a compact disk.

Another object of this invention is to provide a economical lifting device for a compact disk.

Another object of this invention is to provide a lifting device which engages with the carrier for a compact disk to remove the disk from the carrier.

Other objects of the invention will become apparent on a reading of the following description taken with the accompanying drawings.

BRIEF DESCRIPTION OF THE DRAWINGS

FIG. 1 is a perspective view of the invention.

FIG. 2 is a longitudinal sectional view of the invention in association with a compact disk and disk carrying case shown for illustrative purposes.

FIG. 3 is the sectional view of FIG. 2 with the invention engaged and supporting the disk above the disk carrying case.

FIG. 4 is an enlarged view of the area circled in FIG. 2 and designated by numeral 4.

FIG. 5 is a longitudinal sectional view of an alternative of the first embodiment of the invention.

FIG. 6 is a longitudinal sectional view of a second embodiment of this invention.

FIG. 7 is an enlarged view of a fin used in this invention.

DESCRIPTION OF THE PREFERRED EMBODIMENTS

The preferred embodiments herein depicted are not intended to be exhaustive or to limit the application to the precise forms disclosed. Rather they are chosen and described so that others skilled in the art may utilize their teachings.

A typical compact disk 1 and compact disk case 2 are illustrated in FIGS. 2 and 3. Disk 1 includes a central opening 3 for accommodating a spindle of a CD player (not shown). Case 2 includes a plurality of arms 4 extending upwardly from the case. Each arm 104 is bent as illustrated to form projections 5 for engaging the edge of the CD opening 3 and frictionally retaining the CD within the case. To remove the CD a user pushes down on the arms 104 to disengage protrusions 5 from the CD. The CD may then be lifted from the case. Typically the arms are pushed down and the CD removed by the user's fingers. The specific construction of the CD as well as the CD case are known and do not form a novel portion of the invention. They are shown for illustrative purposes only to provide a clearer understanding of the invention.

The CD lifting device 10 of this invention illustrated in the drawings includes a tubular housing 12 having opposite longitudinal ends 14, 16. An annular grove is formed in housing 12 adjacent end 14 to seat O-ring 58. Longitudinal slots (not shown) are diametrically formed in end 14 and intersect the annular grove. Tubular housing 12 includes an internal shoulder 24. A ring stop 26 is secured within housing 12 adjacent end 16. A plunger 28 having opposite longitudinal ends 20, 32 is shiftably carried within housing 12. End 20 of plunger 28 is tapered and end 32 terminates in a blunt end. An end cap 42 is secured to end 32 of plunger 28. Cap 42 includes an annular flange 44. Plunger 28 includes a sleeve 34 which with the shaft 29 of the plunger forms shoulders 38 and 40. A fin 46 illustrated best in FIG. 7 is positioned within each slot of housing 12 and includes a leg 48 and arm 50 which meet at an acute inside angle forming a seat 52. Leg 48 widens with distance from seat 52. Fin 46 is thin in cross-section and includes an inner edge 54 and outer edge 56. Each fin 46 is retained within a slot in housing 12 by O-ring 58 contacting seat 52 with the outer edges 56 of a pair of retained fins being in facing alignment.

Plunger 28 is longitudinally shiftable between a retracted position of FIGS. 1 and 2 and the extended position of FIG. 3. As plunger 28 is urged toward the extended position bevelled end 20 of the plunger contacts each fin 46 at its inner edge 54 to shift the leg 48 of each fin outwardly rotating the fins about O-ring 58. As the plunger is shifted into its retracted position O-ring 58 draws legs 48 inwardly into the position of FIGS. 1 and 2.

In use to remove CD 1 from its case 2 device 10 is positioned over the center of the CD opening with legs 48 of fins 46 position within the space formed between the adjacent arms (see FIG. 2). As illustrated end 14 of housing 12 is positioned to rest on the arms. A slight downward pressure is applied on the flexible arms by pressing end 14 of housing 12 against the suspended ends of the arms in the direction of arrow 27 (see FIG. 3). This pressure releases the CD from the carrier. The plunger 28 is then shifted from its retracted position to its extended position to engage the fins 46 and rotate legs 48 outwardly in the direction of arrows 25 to engage the lower edge of the CD center opening. The CD is then lifted off the case arms and rides upwardly on outer edges 56 of the fins until contacting O-ring 58. O-ring 58 acts as a bumper to protect the CD from damage by the lifting action. The CD now firmly retained by fins 46 may be carried to a position over the spindle of a CD player (not shown). To release the CD plunger 28 is shifted into its retracted position and O-ring 58 causes fins 48 to retract allowing the disk to slip off the tool 10. In the tool of FIGS. 1-3 the plunger is shifted into its extended position by applying pressure against cap 42 in the direction of the housing 12. The plunger is retracted by placing opposite pressure on the cap such as by engaging the inner surface of flange 44 with the user's thumb in a flicking action.

The tool 10 of this invention may also be used to pick up a CD from a flat surface such as a table top. As illustrated best in FIG. 2 the thickness of CD 1 is reduced adjacent the center opening. This reduction causes a gap under the CD adjacent the opening when the CD is placed on a flat surface. To lift the CD the tips 47 of fins 46 extend into this gap when fins 46 are extended to cause the CD to ride up the outer edge of the fins.

An alternative embodiment of tool 10 of FIGS. 1-3 is illustrated in FIG. 4. A common numbering scheme is used between FIGS. 1-3 and 4 wherein primed numbers indicate similar form and function. Tool 10' includes all the elements of tool 10 described above except for the elimination of cap 42. Therefore, the identification of the parts and their function previously described need not be reiterated here. In addition to the toll of FIGS. 1-3, tool 10' includes a helical spring 60 carried by the plunger shaft 29' and positioned between housing shoulder 24' and shoulder 38' of plunger 28'. Spring 60 normally biases plunger 28' into its retracted position. In use, a user applies pressure on end 32' of plunger 28' to spread fins 46' for lifting a CD and releases the pressure to allow spring 60 to urge plunger 28' into the retracted position of FIG. 5.

A second embodiment of the invention is illustrated in FIG. 6. Tool 62 of FIG. 6 includes a cylindrical housing 64 having an interior chamber 66. Chamber 66 includes an internal shoulder 68 as illustrated. A slide 70 is carried by housing 64 within chamber 66 and includes a camming end 72 and a shaft 74. A nub 75 extends outwardly from shaft 74 through an opening 73 in housing 64. Slide 70 is longitudinally shiftable between the retracted position of FIG. 6 and an extended position not shown. A plunger assembly 74 is carried by housing 64 in communication with chamber 66. Plunger assembly 74 includes a tubular housing 76 secured within a side opening of housing 64. Tubular housing 76 includes an annular grove (now shown) adjacent its distal end and a pair of diametrically formed slots (not shown). As with previous embodiments a fin 80 is positioned within each slot and retained there by an O-ring 82. Fins 80 are identical in form and function as fins 46 of FIGS. 1-5 and therefore need not be described here again. A Stop disk 84 is secured within tubular housing 76 adjacent one end 83 of the tubular housing. A cam 86 having opposing bevelled ends 88, 90 and a collar 96 is positioned within tubular housing 76. A helical spring 98 is carried by cam 86 positioned between collar 96 and end 81 of the housing to bias cam 86 toward camming end 72 of slide 70. As slide 70 is shifted toward end 98 of housing 64, end 88 of cam 86 contacts camming end 72 to shift cam 86 toward fins 80 to rotate the fins in a manner consistent with previous embodiments. When slide 70 is retracted spring 98 shifts cam 86 into its retracted position of FIG. 6.

It should be understood that the invention is not to be limited to the precise forms disclosed but may be modified within the scope of the appended claims.

We claim:

1. A device for lifting and releasing ring-like objects having a disk-shaped body and a central opening, said device including a housing having a side wall and opposite longitudinal ends, fin means positioned in said housing adjacent one end of said housing and being shiftable between a retracted position and an extended position relative to said housing side wall, said fin means for lifting and carrying said ring-like objects when shifted from said retracted position to said extended position and for releasing said ring-like objects when the fin means is shifted from said extended position towards said retracted position, plunger means shiftably carried by said housing for shifting said fin means from said retracted position to said extended position, biasing means carried by said housing adjacent said one end and engaging said fin means, said biasing means positioned against said fin means at a prespecified location wherein said biasing means also constitutes cushion means for supporting said ring-like object as the fin means is shifted into its said extended position, said biasing means securing the fin means against longitudinal movement relative to said housing and for urging said fin means towards its retracted position.

2. The device of claim 1 wherein said fin means includes a pair of fins each having a leg and an arm forming a seat at their junction, said biasing means including a resilient O-ring engaging each said fin at its seat to bias each fin leg inwardly relative to said housing.

3. The device of claim 2 wherein the arm of each said fin means extends radially outward from said housing side wall.

4. The device of claim 2 wherein the leg of each fin widens with distance from said seat, each of said fins include an inner edge and outer edge, said plunger means including a tapered end for engaging said inner edge of said fins.

5. The device of claim 1 including spring means carried by said housing in engagement with said plunger for biasing said plunger away from said find means.

6. The device of claim 1 further including a second housing having a side wall wherein said plunger means extends transversely into an opening in said second housing side wall, camming means being carried by said second housing engagable with said plunger means for camming said plunger between an extended position engaging said fin means and a in a retracted position.

7. The device of claim 1 wherein said fin means extends outwardly of said housing one end.

8. The device of claim 1 and stop means defined in said housing, said stop means for limiting shifting movement of said plunger means.

* * * * *